(12) United States Patent
Albright et al.

(10) Patent No.: US 7,472,785 B2
(45) Date of Patent: Jan. 6, 2009

(54) CONVEYOR SYSTEM WITH AUTOMATIC INCLINE

(75) Inventors: Chris Albright, Brodhead, WI (US); Claude McFarlane, Fitchburg, WI (US); George Cicci, Fitchburg, WI (US)

(73) Assignee: Kuhn North America, Inc., Brodhead, WI (US)

( * ) Notice: Subject to any disclaimer, the term of this patent is extended or adjusted under 35 U.S.C. 154(b) by 155 days.

(21) Appl. No.: 11/545,563

(22) Filed: Oct. 11, 2006

(65) Prior Publication Data
US 2008/0105520 A1 May 8, 2008

(51) Int. Cl.
B65G 21/00 (2006.01)
B65G 25/04 (2006.01)

(52) U.S. Cl. .................... 198/589; 198/592; 198/369.2; 198/861.2; 198/750.1

(58) Field of Classification Search ................. 198/586, 198/589, 592, 861.2, 369.2, 750.1, 750.14, 198/621.4
See application file for complete search history.

(56) References Cited

U.S. PATENT DOCUMENTS

| | | | | |
|---|---|---|---|---|
| 4,129,229 A | * | 12/1978 | Brown | 221/129 |
| 4,202,434 A | * | 5/1980 | Herron | 198/316.1 |
| 4,730,973 A | * | 3/1988 | Sokolovsky et al. | 414/421 |
| 5,090,550 A | * | 2/1992 | Axmann | 198/313 |
| 5,099,634 A | * | 3/1992 | Treloar | 53/475 |
| 5,692,593 A | * | 12/1997 | Ueno et al. | 198/369.2 |
| 5,788,461 A | * | 8/1998 | Easton et al. | 414/796.2 |
| 5,909,796 A | * | 6/1999 | Soldavini | 198/369.2 |
| 6,390,278 B1 | * | 5/2002 | Brown | 198/463.3 |
| 6,409,011 B1 | * | 6/2002 | Ferguson | 198/861.3 |
| 6,739,445 B2 | * | 5/2004 | Armstrong | 198/435 |
| 7,080,541 B2 | * | 7/2006 | Xiong | 72/405.02 |

* cited by examiner

*Primary Examiner*—Douglas A Hess
(74) *Attorney, Agent, or Firm*—Oblon, Spivak, McClelland, Maier & Neustadt, P.C.

(57) ABSTRACT

A conveyor assembly including a first conveyor frame configured to move along a path relative to a mounting frame and including a conveyor belt. The conveyor assembly further includes a second conveyor frame, connected to the first conveyor frame via a pivot, and configured to automatically rotate to change an angle between the first conveyor frame and the second conveyor frame in response to movement of the first conveyor frame relative to the mounting frame.

21 Claims, 6 Drawing Sheets

CONVEYOR SYSTEM WITH AUTOMATIC INCLINE

BACKGROUND OF THE INVENTION

1. Field of the Invention

This invention relates to a conveyor system, for example, a conveyor system used for agricultural mixers. In one embodiment, the present invention is directed to a conveyor system used in a vertical-type feed mixer.

2. Discussion of the Background

Agricultural mixers are used for mixing hay and silage together with other nutrients including animal feed supplements and grains. The mixers are normally mounted on an undercarriage to be powered and pulled by a tractor, or mounted on a truck chassis to be self-propelled. The feed materials are discharged and fed to various livestock such as cattle and dairy cows. Sometimes the mixing of such feed includes depositing a whole round or square hay bale into the mixer and processing to the desired consistency before and during the mixing of the other feed ingredients.

In conventional feed mixers there are many different configurations including horizontal augers, reel type arrangements, and vertical augers. Each of these arrangements utilizes one or more augers to facilitate the processing of the various feed materials. When the feed materials have been mixed in the equipment, the resulting feed must be discharged into a feed bunk or other area suitable for the livestock to eat. Generally, these feed mixers utilize a conveyor system to transport the feed from the inside of the equipment to the bunk or feeding area.

In horizontal auger and reel type mixers where the mixer body is generally "V" shaped, an inclined conveyor is normally mounted to the mixer at one end, below the discharge opening. The conveyor can use augers, a chain and slat, or a belt arrangement to convey the feed materials away from the discharge opening.

In vertical auger mixers or "vertical mixers" where the mixer body is generally shaped like a cone, a front conveyor is commonly utilized. Conventional front conveyors are generally positioned horizontally, adjacent to a large discharge opening in the front of the mixer. The conveyor can sometimes slide to the left or right, to allow discharge on either side of the mixer. The conveyor is required to slide in order to extend outward away from the mixer far enough so that the discharging feed materials do not interfere with the tires. Sometimes these horizontal conveyor motors can run forward and backward, allowing feeding on either side without removing the conveyor. Often the conveyors are flat on both ends, and sometimes there is a second section that tips up. On conveyors that tip up at the ends, there is either a manual height adjustment for the angle of incline, or a hydraulic cylinder is used to change the incline angle.

A "dedicated hydraulic output," sometimes termed a "hydraulic circuit," is an output from a control valve or manifold of control valves which is used to pressurize or depressurize a hydraulic line that actuates a device. For example, a tractor is typically equipped with a hydraulic pump which pressurizes a manifold of control valves. Switches inside the cab of the tractor control each of the control valves. Each control valve is connected in series with a device such as a cylinder, valve, or hydraulic motor and causes pressurized hydraulic fluid to flow to the device when the control valve is opened. Thus, the operator of the tractor can selectively actuate various devices by opening and closing various control valves, and therefore, by controlling the dedicated hydraulic outputs.

The vertical auger mixer typically requires one dedicated hydraulic output to operate a discharge door cylinder. Another dedicated hydraulic output is required to operate the conveyor belt motor. A third dedicated hydraulic output is needed to slide the conveyor back and forth, and a fourth dedicated hydraulic output is required in order to independently incline the end of the conveyor. Normal tractors have two or three dedicated hydraulic outputs available if no extra dedicated hydraulic outputs have been added. Therefore, a disadvantage of known vertical auger mixer conveyors is that they require up to four dedicated hydraulic outputs to fully utilize a front conveyor assembly.

Another disadvantage of conventional front conveyors is that there is a certain amount of operator training and coordination required to be able to operate the three or four different dedicated hydraulic outputs accurately and efficiently while also operating a tractor.

Another disadvantage of conventional front conveyors is that they often are not capable of discharging from either side of the machine without a complete reorientation of the conveyor.

Another disadvantage of conventional front conveyors is that the height of the conveyor tip is often fixed, without adjusting means, which limits the flexibility of the equipment.

SUMMARY OF THE INVENTION

Accordingly, it is an objective of an exemplary embodiment of the present invention to provide a conveyor system which overcomes some or all of the problems associated with known devices and makes a considerable contribution to the art of mixing and discharging materials. Other objects and advantages of exemplary embodiments of the present invention are one or more of the following:

a) to provide a conveyor system which utilizes a single hydraulic cylinder to position the conveyor in both left and right positions and to position the end of the conveyor in raised and lowered positions;

b) to provide a conveyor system in which a single dedicated hydraulic output positions the conveyor left and right, the end of the conveyor up and down, and powers the belt drive motor;

c) to provide a conveyor system which can discharge out either end of the conveyor without fewer modifications than conventional systems;

d) to provide a conveyor system in which the drive motor is automatically engaged when the conveyor reaches the proper position;

e) to provide a conveyor system in which the path length of the belt does not substantially change, regardless of belt direction or incline angle; and f) to provide a conveyor system in which operating the entire assembly is simple to learn and control.

Accordingly, one aspect of an embodiment of the present invention includes a conveyor system that is capable of positioning a conveyor in both left and right positions, inclining the end of the conveyor both up and down, and operating the belt in either direction with only a single dedicated hydraulic output.

Another aspect of an embodiment of the present invention includes a conveyor assembly including a first conveyor frame configured to move along a path relative to a mounting frame and including a conveyor belt. The conveyor assembly further can include a second conveyor frame, connected to the first conveyor frame via a pivot, and configured to automatically rotate to change an angle between the first conveyor frame and the second conveyor frame in response to movement of the first conveyor frame relative to the mounting frame.

Another aspect of an embodiment of the present invention includes a conveyor assembly including a first conveyor frame configured to move along a path relative to a mounting frame and including a conveyor belt. This embodiment can further include a second conveyor frame, connected to the first conveyor frame via a pivot, and a mechanism for changing an angle between the first conveyor frame and the second conveyor frame in response to movement of the first conveyor frame relative to the mounting frame.

Another aspect of an embodiment of the present invention includes a conveyor assembly including a piston coupled to a conveyor frame and configured to move the conveyor frame along a path. This embodiment can further include a belt wrapped around the conveyor frame, a motor coupled to the conveyor frame, a valve in fluid communication with the motor, at least one arm connected to the conveyor frame such that the arm moves with the conveyor frame when the conveyor frame moves, and the arm makes contact with the valve to actuate the valve and rotate the motor in a first direction when the conveyor frame is in a first position, and the arm is separate from the valve when the conveyor frame is in a second position such that the valve de-actuates and the motor stops rotating.

Another embodiment of the present invention can include the fact that a single hydraulic valve, which is directly controlled by an operator, and cylinder control all the functions of the conveyor. Thus, the system can function with only one dedicated hydraulic output and control.

Another embodiment of the present invention can include adjustability of the conveyor incline angle for different unloading heights.

Another embodiment of the present invention can include a conveyor system that can fold into a narrow configuration for transport, and can extend and discharge to either side for more efficient and flexible feeding.

Another embodiment of the present invention can include a drive motor that cannot be started until the conveyor is shifted completely into operating position, eliminating the possibility of operator error.

BRIEF DESCRIPTION OF THE DRAWINGS

These and other advantages of the invention will become more apparent and more readily appreciated from the following detailed description of the exemplary embodiments of the invention taken in conjunction with the accompanying drawings, where.

DETAILED DESCRIPTION OF THE INVENTION

Figure 1:
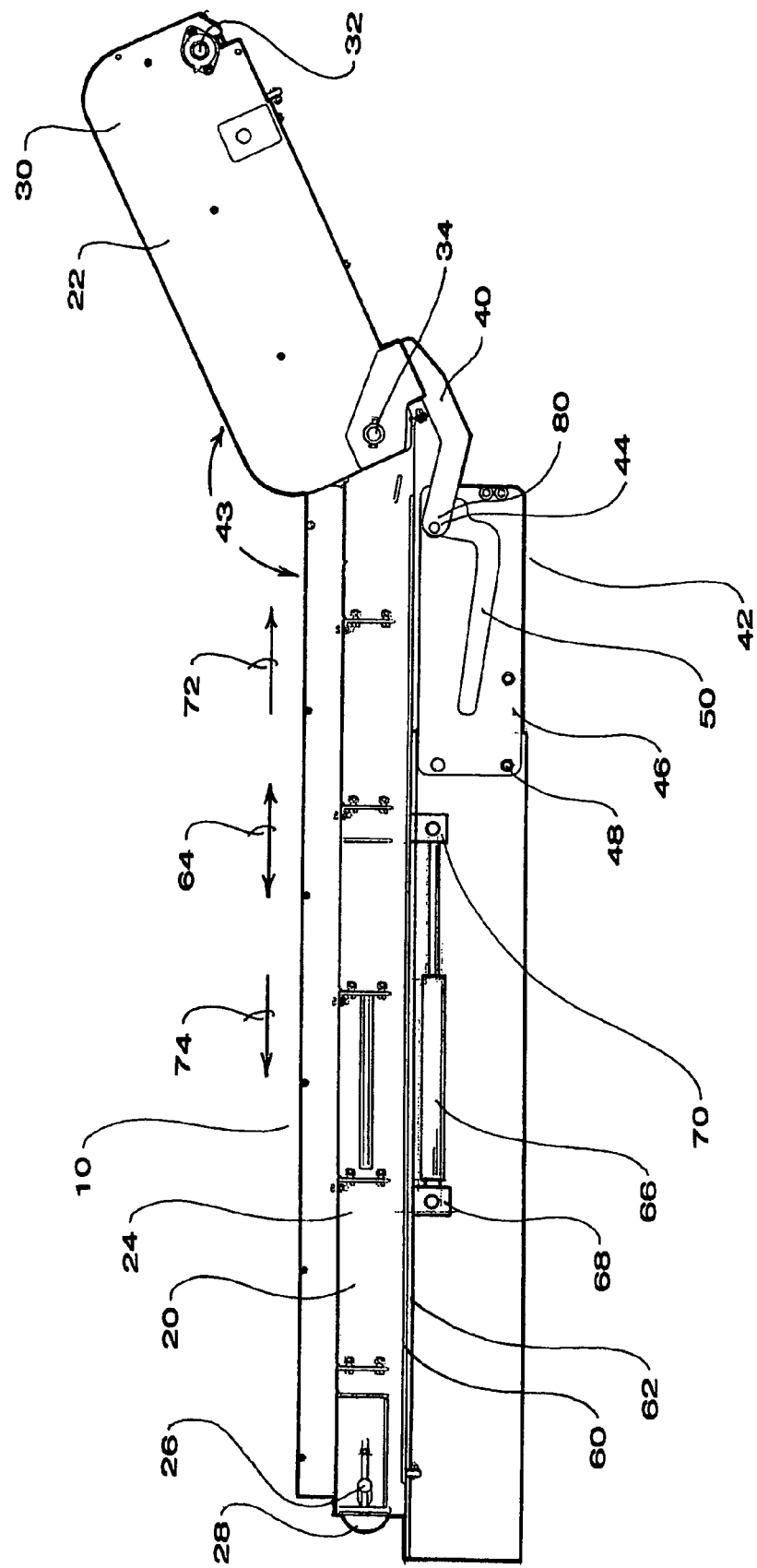
FIG. 1 is a side view of the conveyor system in the right discharge position.
Figure 2:
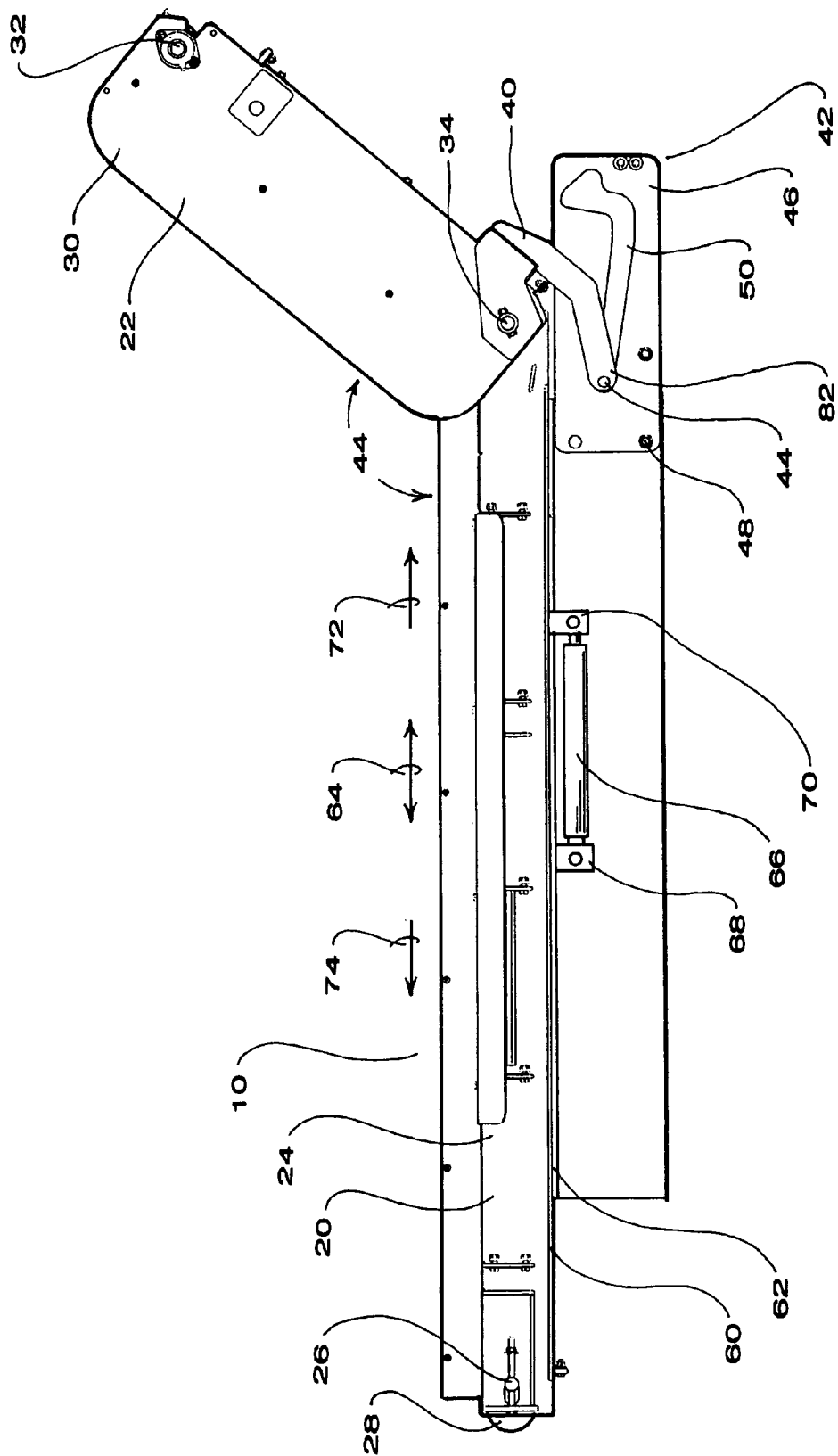
FIG. 2 is a side view of the conveyor system in the left discharge position.
Figure 3:
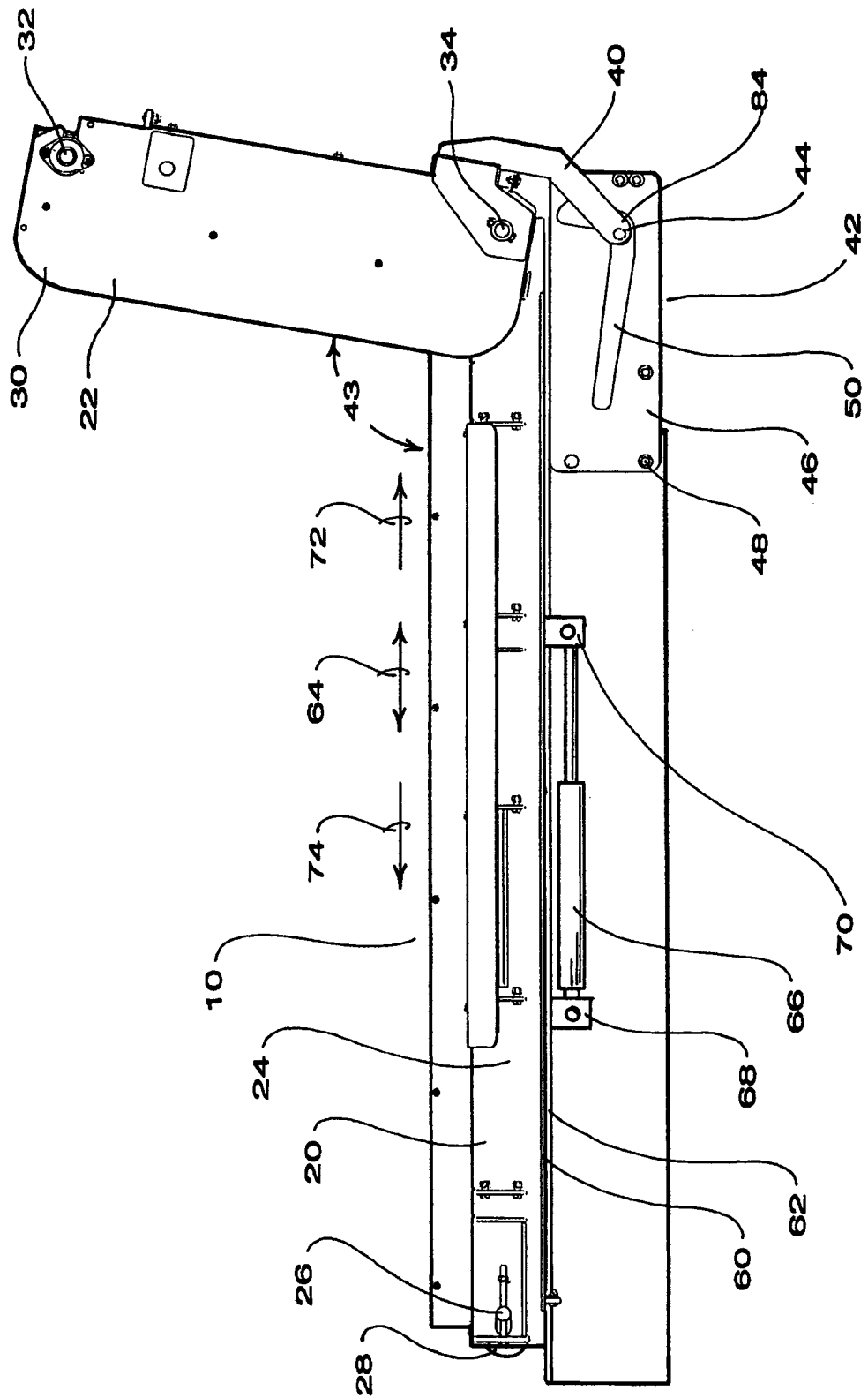
FIG. 3 is a side view of the conveyor system in the transport position.

The various embodiments of the invention can be understood from the following detailed description when read in conjunction with the accompanying drawings. With reference to FIGS. 1 through 3, one exemplary embodiment of the present invention is a conveyor system 10, which can be mounted on agricultural or industrial equipment such as vertical feed mixers. The conveyor system 10 can be installed underneath the discharge opening of mobile mixing and feeding equipment to facilitate unloading of the materials being mixed. The conveyor system 10 includes a first conveyor frame 20 and a second conveyor frame 22. The first conveyor frame 20 includes a pair of side members 24, which are spaced and parallel to each other along a longitudinal axis of the first conveyor frame 20. The first conveyor frame 20 also includes a first belt pulley 26, each end of which is mounted to a side member 24. When describing a "pulley," it is to be understood that any of a variety of motion facilitating devices can be used such as multiple pulleys, rollers, and slides configured to allow a belt to move in an arc, for example. A pulley driven by the motor will be configured to impart motion to the belt via friction or some form of interlocking mechanism such as gear teeth. The first belt pulley 26 is configured to support and guide a belt 28 which spans between the side members 24 of the first conveyor frame 20. The belt 28 can be a variety of different configurations including, for example, a rubber continuous loop belt or a pair of link chains with slats with the belt pulley 26 designed to drive and guide the particular belt 28 configuration. Typically, the first conveyor frame 20 is positioned approximately horizontally during normal use. In other words, the first conveyor frame 20 is not tilted by more than 15 degrees from horizontal.

The second conveyor frame 22 includes a pair of further side members 30, which are also spaced and can be parallel to each other. The second conveyor frame 22 also includes a second belt pulley 32, which is mounted on the further side members 30. The second belt pulley 32 supports and guides the belt 28, which spans between the further side members 30 of the second conveyor frame 22. The first conveyor frame 20 is pivotally connected to the second conveyor frame 22 at a frame pivot 34, which allows the second conveyor frame 22 to pivot at various angles relative to the first conveyor frame 20. The pivot 34 can be positioned such that any change in length of travel of the belt 28 around the frames is minimized as the second conveyor frame 22 is inclined. Thus, the length of travel of the belt 28 remains approximately the same (does not vary by more than 5%) regardless of the position of the second conveyor frame 22.

The second conveyor frame 22 also includes a cam arm 40, which can be rigidly attached to the second conveyor frame. The cam arm 40 can be attached adjacent to the frame pivot 34 as shown. The cam arm 40 can also include a plurality of cam arms 40 to achieve the same effect. The cam arm 40 is a part of a cam arrangement 42, which changes the incline angle 43 between the first conveyor frame 20 and the second conveyor frame 22 when the first conveyor frame 20 is slid along the frame of the mixing equipment. A cam follower 44 is attached to the cam arm 40 at the distant end from the second conveyor frame 22. A cam plate 46 is rigidly attached to the mixing equipment via cam plate mounting bolts 48, and includes a cam slot 50 to guide the cam follower 44.

The first conveyor frame 20 includes a conveyor mounting frame 60, which can take the form of a rail, at the lower edge of the first conveyor frame 20. The mixing equipment can also include a guide 62 configured to allow the first conveyor frame 20 to slide back and forth to provide frame movement shown by arrow 64 along the longitudinal axis of the first conveyor frame 20. A cylinder 66 can be mounted at one end to a first mounting tab 68, which is attached to the guide rail 62 and mounted at a second end to a second mounting tab 70, which is attached to the conveyor mounting frame 60. The frame movement 64 includes moving the first conveyor frame 20 in a first direction 72, and alternatively in a second direction 74. This frame movement 64 is accomplished by extending and retracting the cylinder 66, which slides the first conveyor frame 20 on the guide rail 62. A single dedicated hydraulic output is used to extend and retract the cylinder 66.

As shown in FIG. 1, when the first conveyor frame 20 is slid in a first direction 72 to its full extent, the cam follower 44 is located in a first position 80 of the cam slot 50, which inclines the second conveyor frame 22 for proper unloading on one side of the equipment. As shown in FIG. 2, when the first conveyor frame 20 is slid in a second direction 74 to its full extent, the cam follower 44 is located in a second position 82 of the cam slot 50, which inclines the second conveyor frame 22 for proper belt 28 tension for proper unloading on a second side of the equipment. As shown in FIG. 3, when the first conveyor frame 20 is slid in an intermediate position, the cam follower 44 is located in a third position 84 of the cam slot 50, which inclines the second conveyor frame 22 relatively vertical for transport. In this description, "relatively vertical" means between 70 and 110 degrees.

Figure 4:
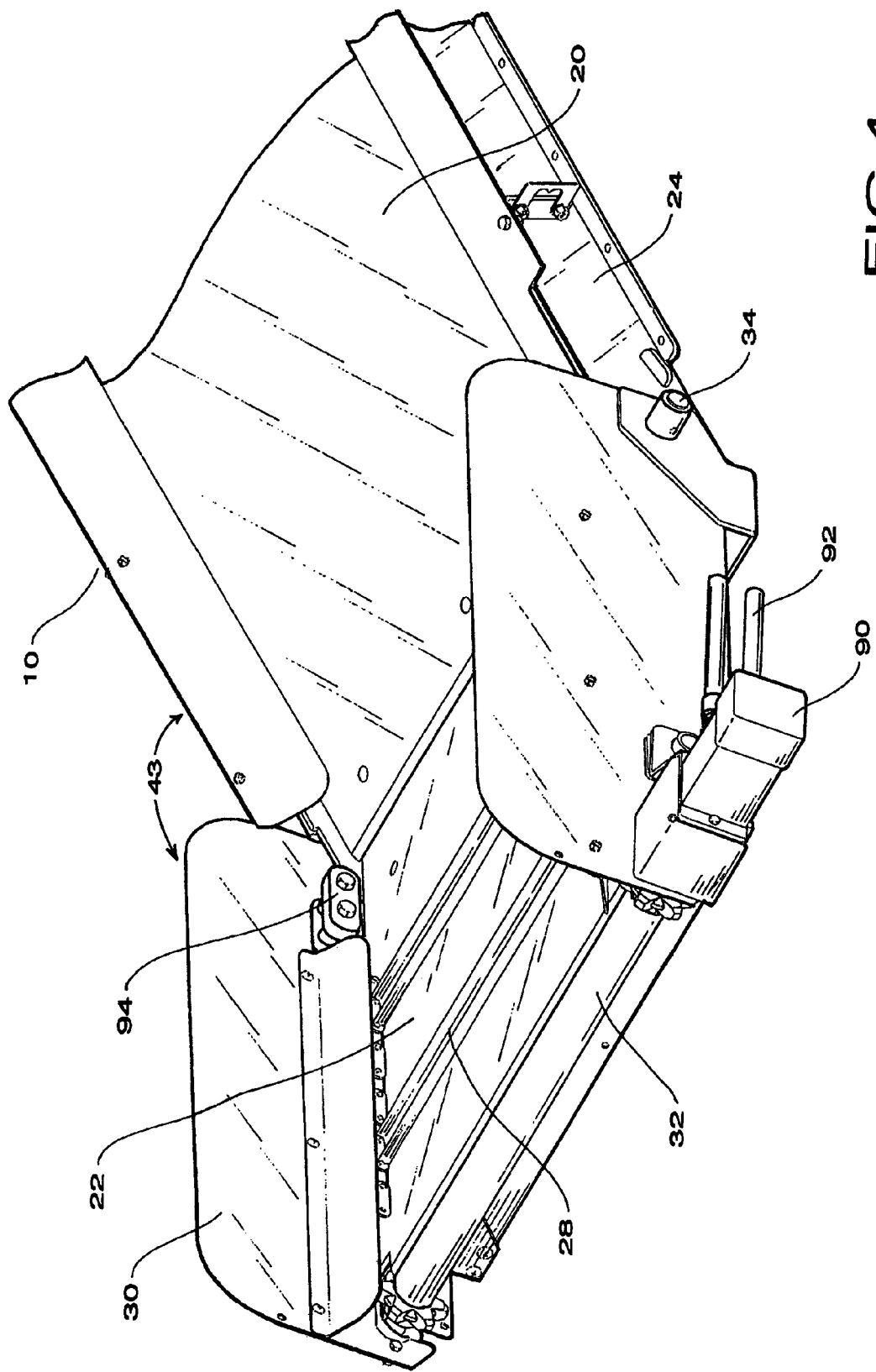
FIG. 4 is an isometric view of the conveyor system.

With reference to FIG. 4, a motor 90 is positioned on the end of the second belt pulley 32 to drive the belt 28. The motor 90 is powered by hydraulic pressure from a power unit such as a tractor (not shown) through the hydraulic hoses 92. Adjacent to the frame pivot 34 is a pair of belt hold downs 94 which keep the belt close to the second conveyor frame 22 while it is inclined. One benefit of positioning the motor 90 on the end of the second belt pulley 32 is that the motor 90 is better able to pull than to push the belt 28 "up hill" when the belt 28 is loaded with feed. Thus, by coupling the motor 90 to the pulley 32 located on or around the end of the second conveyor frame 22, the motor 90 is better able to move the belt 28 to discharge feed at an elevation.

Figure 5:
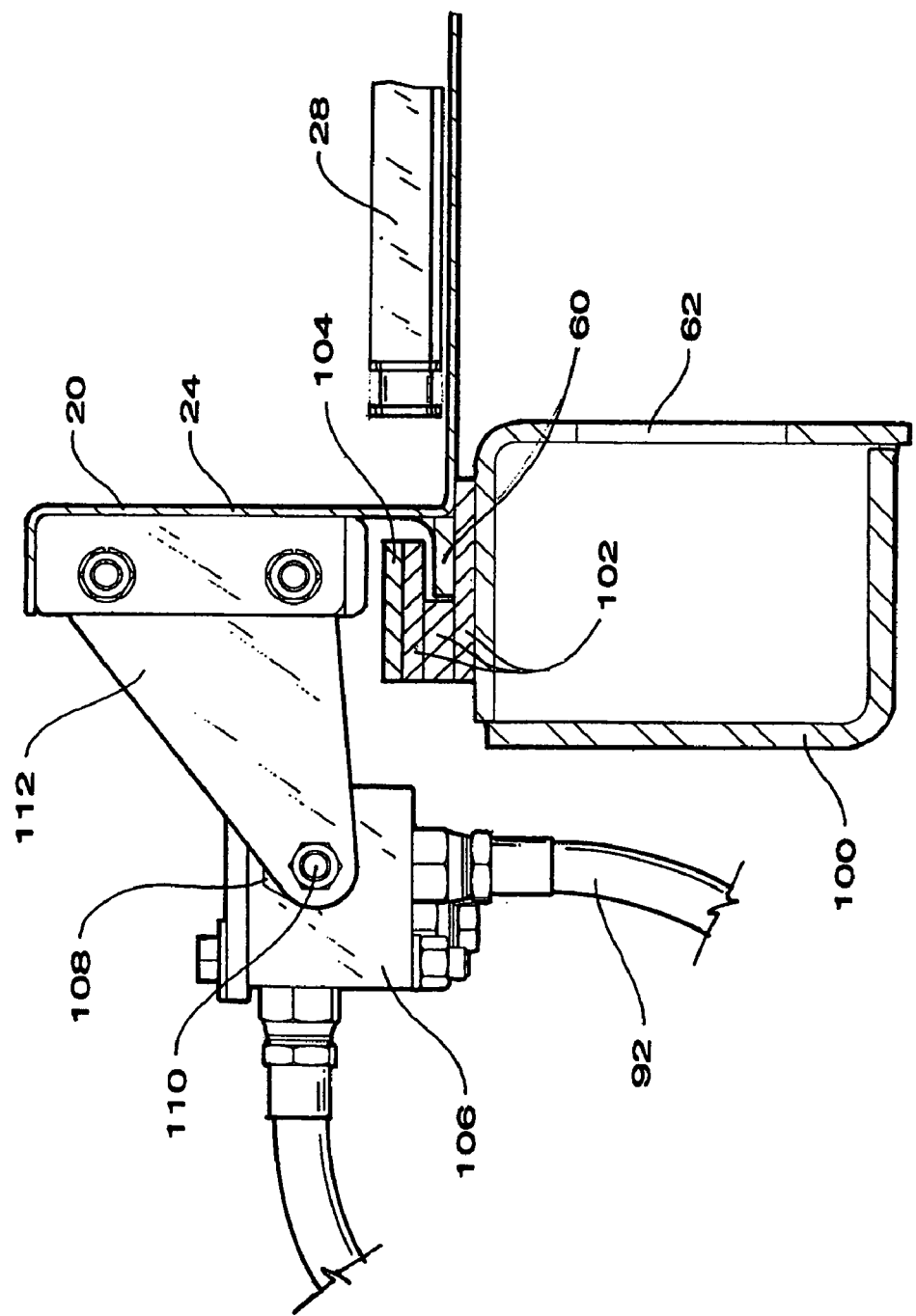
FIG. 5 is a section view through the equipment frame.
Figure 6:
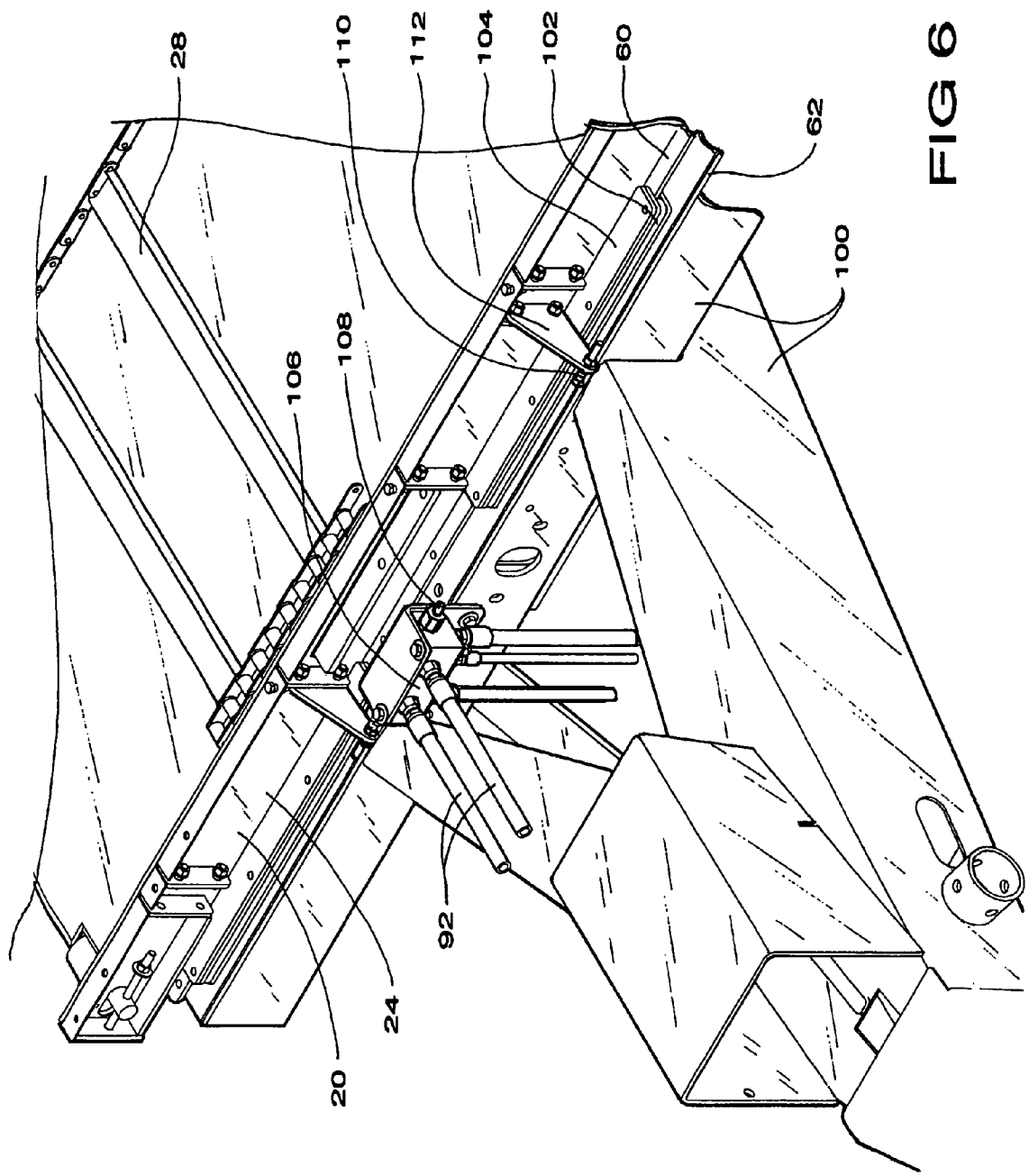
FIG. 6 is an isometric view of the conveyor system.

With reference to FIG. 5 and FIG. 6, the equipment frame 100 is shown, which includes the guide rail 62 for supporting the first conveyor frame 20. The equipment frame 100 may be a dedicated frame to which the conveyor system 10 is attached and which does not include a mixing or towing apparatus. Alternatively, the equipment frame 100 may be part of a trailer or the mixing apparatus itself. The conveyor system 10 is typically used in a manner such that the longitudinal axis of the first conveyor frame 20 is perpendicular to the direction of travel of the mixing apparatus. In other words, the mixing apparatus is pulled or propelled (on its own wheels or a separate trailer) in a first direction while the conveyor system 10 moves the feed from the mixing apparatus in a second direction perpendicular to the first direction. A rail bearing material 102 is used to help the conveyor mounting frame 60 slide along the length of the guide rail 62. The rail bearing material 102 is preferably a nylon or plastic material which may be formed in several separate pieces which surround and capture the conveyor mounting frame 60. The rail bearing material 102 may be held in place by a bearing support 104 which is typically made of steel, for example, but other durable materials may be used. Other bearing systems may be used in combination with or in place of the bearing material 102. For example, rollers may be used.

A valve 106 is mounted to the equipment frame 100. The valve 106 typically has at least two valve spools 108 which change the flow of hydraulic oil inside the valve 106. The valve spools 108 are actuated by valve actuators 110, which are mounted on actuator arms 112 mounted on the side members 24 of the first conveyor frame 20. When the cylinder 66 (shown in FIGS. 1-3) slides the first conveyor frame 20 along the guide rail 62, the valve actuators 110 push the valve spool 108 and hydraulically actuate the motor 90 (shown in FIG. 4) to start the belt 28 rotating around the first and second belt pulleys 26 and 32.

In an alternate embodiment, the arms 112 are replaced or supplemented with a fluid switch or switches. When a fluid switch is used the valve 106 is a fluid actuatable valve, and when the first conveyor frame 20 moves beyond a predetermined position, the fluid switch will actuate in response to the movement of the conveyor frame 20 and send a fluid signal to the valve 106. Once the valve 106 receives the fluid signal from the fluid switch, the valve 106 supplies pressurized fluid to the motor 90 as described in the first embodiment. Thus, the valve 106 may be located remotely from the first conveyor frame 20.

In another non-limiting embodiment, two valves 106 may be used which are alternately actuated and de-actuated by the movement of the first conveyor frame 20.

Thus, by moving the first conveyor frame along a path, a sequence of events is set in motion such that the second conveyor frame is inclined or declined as desired, and the motor 90 is activated in the appropriate direction. Typically, the second conveyor frame 22 is inclined such that the angle 43 is 140 to 160 degrees during discharge when elevated discharge is required. In other words, when the first conveyor frame 20 is horizontal, belt 28 pulls feed up a 20 to 40 degree incline. Steeper inclines require specially formed belts in order to prevent feed on the belt from falling backwards as it is pulled up the incline. Alternatively, the second conveyor can be configured to discharge in a horizontal or mostly horizontal arrangement. Differences in inclines achieved by the second conveyor frame 22 can be achieved by modifying or replacing the cam slot 50, the cam arm 40, or both. Thus, the second conveyor frame 22 can discharge at various elevations based on which cam slot 50 and cam arm 40 is installed.

Various alternative embodiments of the present invention are possible. For example, in one alternative embodiment, the cam plate 46 is mounted on the second conveyor frame 22, and the cam follower 44 is mounted on the equipment frame 100.

In another alternate embodiment, the motor 90 is coupled to a pulley coaxial with the frame pivot 34. By coupling the motor 90 to a pulley coaxial with the frame pivot 34, the length of the hydraulic lines connected to the motor 34 is shortened, and bending of the lines during inclination is reduced.

In another alternate embodiment, the cylinder 66 is coupled between the second conveyor frame 22 and the equipment frame 100.

In another non-limiting embodiment, the first conveyor frame 20 is equipped with a second conveyor frame 22 on each end of the first conveyor frame 20.

It should be understood that numerous modifications and variations of the present invention are possible in light of the above teachings. It is therefore to be understood that, within the scope of the appended claims, the invention can be practiced otherwise than as specifically described herein.

What is claimed is:

1. A conveyor assembly comprising:
a first conveyor frame configured to move along a path substantially parallel to a mounting frame and including a conveyor belt; and
a second conveyor frame, connected to the first conveyor frame via a pivot, and configured to automatically rotate to change an angle between the first conveyor frame and the second conveyor frame in response to movement of the first conveyor frame relative to the mounting frame.

2. The conveyor assembly according to claim 1, further comprising:
first and second side members offset from each other;

first and second pulleys attached to first and second conveyor frames, respectively, and around which the conveyor belt is wrapped; and a drive motor configured to drive one of the first and second pulleys.

3. The conveyor assembly according to claim 2, wherein the drive motor is configured to rotate the conveyor belt in each of a first direction and a second direction.

4. The conveyor assembly according to claim 1, wherein a longitudinal axis of the first conveyor frame is positioned approximately horizontally when the conveyor assembly is in use.

5. The conveyor assembly according to claim 1, wherein the first conveyor frame shares a pulley with the second conveyor frame, and the shared pulley has a same axis as the pivot.

6. The conveyor assembly according to claim 1, comprising a single dedicated hydraulic output for sliding the first conveyor frame on the mounting frame and for mechanically changing the incline of the second conveyor frame.

7. The conveyor assembly according to claim 6, wherein the single dedicated hydraulic output engages a drive motor when the first conveyor frame reaches a predetermined location.

8. The conveyor assembly according to claim 6, further comprising a drive motor configured to drive the conveyor belt,
wherein the first conveyor frame automatically engages the drive motor when the first conveyor frame reaches a predetermined location along the path, which said first conveyor frame moves relative to said mounting frame.

9. The conveyor assembly according to claim 6, wherein the first conveyor frame includes at least one stop configured to actuate a valve, which when actuated, engages the drive motor.

10. The conveyor assembly according to claim 9, wherein the at least one stop is adjustable to engage the drive motor at different points along the path.

11. The conveyor assembly according to claim 1, wherein the second conveyor frame is configured to incline using a cam system such that,
when a cam follower of the cam system is in a first position, the first continuous belt rotates in a first direction,
when the cam follower is in a second position, the first continuous belt rotates in a second direction, and
when the cam follower is in a third position, the first continuous belt does not rotate.

12. The conveyor assembly according to claim 11, wherein the angle between the first conveyor frame and the second conveyor frame is a first angle when the cam arrangement is in the first position,
the angle between the first conveyor frame and the second conveyor frame is a second angle, different from the first angle, when the cam arrangement is in the second position, and
the angle between the first conveyor frame and the second conveyor frame is a third angle, different from the first and second angles, when the cam arrangement is in the third position, the third angle being such that the second conveyor is substantially vertical with the ground.

13. The conveyor assembly according to claim 11, wherein a path of the conveyor belt is approximately a same length when the cam follower is in the first, second, and third positions.

14. The conveyor assembly according to claim 1, further comprising a fluid actuated cylinder connected between the mounting frame and the first conveyor frame and configured to move the first conveyor frame relative to the mounting frame.

15. The conveyor assembly according to claim 14, further comprising a cam plate and cam follower that moves within the cam plate in response to movement of the fluid actuated cylinder.

16. The conveyor assembly according to claim 15, wherein the cam plate is mounted on the mounting frame.

17. The conveyor assembly according to claim 1, further comprising a fluid actuated cylinder connected between the mounting frame and the first conveyor frame, the fluid actuated cylinder configured, based on an input from a single dedicated hydraulic output, to move the first conveyor frame, to rotate the second conveyor frame relative to the first conveyor frame, to actuate a valve in fluid communication with a hydraulic motor coupled to a belt wrapped around the first and second conveyor frames.

18. The conveyor assembly according to claim 1, wherein the first and second side members are parallel to each other.

19. A vertical mixer including the conveyor assembly of claim 1.

20. A conveyor assembly comprising:
a first conveyor frame configured to move along a path substantially parallel to a mounting frame and including a conveyor belt;
a second conveyor frame, connected to the first conveyor frame via a pivot; and
means for changing an angle between the first conveyor frame and the second conveyor frame in response to movement of the first conveyor frame relative to the mounting frame.

21. A conveyor assembly comprising:
a piston coupled to a conveyor frame and configured to move the conveyor frame along a path;
a belt wrapped around the conveyor frame;
a motor coupled to the conveyor frame;
a valve in fluid communication with the motor;
at least one arm connected to the conveyor frame such that the arm moves with the conveyor frame when the conveyor frame moves, and the arm makes contact with the valve to actuate the valve and rotate the motor in a first direction when the conveyor frame is in a first position, and the arm is separate from the valve when the conveyor frame is in a second position such that the valve de-actuates and the motor stops rotating.

* * * * *